(12) United States Patent
Walters

(10) Patent No.: US 11,589,557 B2
(45) Date of Patent: Feb. 28, 2023

(54) WEARABLE MAGNET-CONTAINING LEASH FOR ANIMALS

(71) Applicant: Shed Defender, LLC, Yuba City, CA (US)

(72) Inventor: Tyson Walters, Yuba City, CA (US)

(73) Assignee: Shed Defender, LLC, Yuba City, CA (US)

( * ) Notice: Subject to any disclaimer, the term of this patent is extended or adjusted under 35 U.S.C. 154(b) by 126 days.

(21) Appl. No.: 17/076,558

(22) Filed: Oct. 21, 2020

(65) Prior Publication Data

US 2021/0337769 A1 Nov. 4, 2021

Related U.S. Application Data

(60) Provisional application No. 63/019,833, filed on May 4, 2020.

(51) Int. Cl.
*A01K 27/00* (2006.01)

(52) U.S. Cl.
CPC .......... *A01K 27/004* (2013.01); *A01K 27/005* (2013.01)

(58) Field of Classification Search
CPC .... A01K 27/004; A01K 27/005; A01K 27/00; A01K 27/001; A01K 27/002; A01K 27/003; A41F 9/00; A41F 9/02; A41F 9/002; A41F 1/008
See application file for complete search history.

(56) References Cited

U.S. PATENT DOCUMENTS

| | | |
|---|---|---|
| 2,799,245 A | 7/1957 | Ruggiero et al. |
| 4,328,767 A | 5/1982 | Peterson |
| 4,584,967 A | 4/1986 | Taplin |
| 6,499,437 B1 | 12/2002 | Sorenson et al. |
| 7,150,247 B2 | 12/2006 | Eulette et al. |
| 7,281,495 B2 | 10/2007 | Wagner |
| 7,389,750 B1 | 6/2008 | Rogers et al. |
| 7,461,615 B2 | 12/2008 | Albright |
| 8,841,556 B2 | 9/2014 | Rothbaum |

(Continued)

FOREIGN PATENT DOCUMENTS

WO 1985001857 A1 5/1985

OTHER PUBLICATIONS

U.S. Pat. No. 887,072, A, May 12, 1908, Delaney.
International Search Report and Written Opinion for PCT/US21/70487 dated Jul. 28, 2021.

*Primary Examiner* — Kristen C Hayes
(74) *Attorney, Agent, or Firm* — Brian Roffe

(57) ABSTRACT

Animal leash including an elongate member having a first end region and a second, opposite end region. A clip is arranged at the first end region and attaches to the animal's collar. Two pairs of magnetically coupleable magnets are connected to the member with the first pair including a first magnet at the first end region and a second magnet movable longitudinally along the member and the second pair of magnets including a third magnet movable longitudinally along the member and a fourth magnet at the second end region. The member has an extended, use state in which the magnets of both pairs are not magnetically coupled to one another. The magnets are configured and polarized to enable the magnets of both pairs to be magnetically coupled to one another and provide the member with a coiled state around the animal's neck.

20 Claims, 7 Drawing Sheets

FIG. 1A

(56) References Cited

U.S. PATENT DOCUMENTS

| | | | |
|---|---|---|---|
| 8,978,593 B2 | 3/2015 | Catena | |
| 9,066,500 B2 | 6/2015 | Talley | |
| 9,179,647 B2 | 11/2015 | Lambert | |
| 9,549,536 B2 | 1/2017 | Soto | |
| 9,599,145 B2 | 3/2017 | Durfee | |
| 9,961,882 B2 | 5/2018 | Woods | |
| 10,231,439 B2 | 3/2019 | Woods | |
| 2006/0042562 A1* | 3/2006 | Wagner | A01K 27/002 119/792 |
| 2006/0288960 A1* | 12/2006 | Harrison | A01K 27/004 119/794 |
| 2007/0006823 A1* | 1/2007 | Sandberg | A01K 27/008 119/856 |
| 2016/0113245 A1 | 4/2016 | Swanger | |
| 2017/0049078 A1* | 2/2017 | Farrar | A01K 27/001 |
| 2017/0280686 A1* | 10/2017 | Cory | A01K 27/001 |
| 2018/0192617 A1 | 7/2018 | Jirsa et al. | |
| 2019/0059333 A1* | 2/2019 | Lagarde | A01K 27/005 |
| 2019/0208748 A1 | 7/2019 | Young | |

* cited by examiner

WEARABLE MAGNET-CONTAINING LEASH FOR ANIMALS

FIELD OF THE INVENTION

The present invention relates to leashes for animals, primarily domesticated pets, and more particularly to leashes that stay around the pet's neck when not in use.

The present invention also relates to leashes for animals that use magnetism to enable them to be stored around the animal's neck when not in use, and specifically around and outward of the animal's collar.

BACKGROUND OF THE INVENTION

It is common for pet leashes to be misplaced by the pet owner. This issue is eliminated by providing a wearable leash that can be stored in connection with the pet's collar which is almost always worn by the pet. There are several constructions of wearable leashes in the field.

U.S. Pat. No. 887,072 (Delaney) describes a pet collar having a casing and a chain having a handle at one end and secured at its opposite end to a drum inside the casing, and which passes through an aperture in the casing. A coil spring is within the drum. As the chain is pulled outward, the spring is wound up, and as the chain is released, the spring winds up the chain about the drum within the casing. In use, when the leash is secured to a dog's collar and the handle is held, as the dog runs further away from the owner, the leash is paid out and the spring is wound up. As the dog runs nearer the owner, the spring automatically rotates the drum within the casing and winds up the chain or leash, thereby automatically preventing the leash from becoming entangled, and obviating the necessity of winding the leash about the owner's hand to take up slack. If the dog is allowed to run loose, it is unnecessary to remove the leash from the collar for the leash will be automatically wound up within the casing.

U.S. Pat. No. 2,799,245 (Ruggiero) describes a combination recoilable dog leash and collar. The dog leash and collar enable the leash to be wound around and within the collar of the dog. In order to walk the dog, the dog owner bends down and grasps the handle of the lease, pulling it outwardly from the collar of the dog.

U.S. Pat. No. 4,328,767 (Peterson) describes an apparatus including a flat member with two sections or parts, namely, a collar and a leash. The collar is formed by inserting the leash through a buckle device. An outer surface of the collar is covered with VELCRO™ material of one type, while one surface of the leash has VELCRO™ material of the opposite type so that a gripping effect is achieved when the leash is wound over the collar.

U.S. Pat. No. 4,584,967 (Taplin) describes a collar/leash combination for pets that includes a flexible flat member having outer and inner surfaces, a buckle on one end having a frame and a locking pin that pivots on the frame and is insertable through the flexible member so that a collar may be formed by passing the other end of the member through the buckle. The flexible member is kept in place using VELCRO™ material of one type on the outer surface's section of the member that is formed into a collar and the rest of the outer surface has the opposite type of VELCRO™ material. The inner surface of the member has VELCRO™ material of the same type used on the outer surface's collar section.

U.S. Pat. No. 6,499,437 (Sorenson et al.) describes a leash with a magnetic connector that includes first and second connector parts, each having a respective magnet. The magnetic connector automatically aligns the two parts with respect to one another when the two parts of the connector are brought closely together and automatically interlocks the two parts of the connectors when tension is applied. Tension on the leash automatically moves the first connector part to a second position, and thereby automatically interlocks the first and second connector parts.

U.S. Pat. No. 7,150,247 (Eulette et al.) describes a wearable retracting animal leash designed to attach to the collar of a pet and be permanently worn in this manner. The leash includes a handle that fits neatly against the case when the leash is in a retracted condition. The leash includes a case, an attachment mechanism affixed to the case and which attaches the leash system to a pet collar, a grip handle on an exterior portion of the case, a leash attached to the grip handle, a leash spool having the leash coiled about it in a retracted state and having a spool spindle about which it rotates, and a thin coil spring that is not fixed on one end and is free to rotate, and affixed on another end to the leash spool. The spring provides a rotational bias to the leash spool in a leash retraction direction. A stop mechanism permits the leash to be extended, but prevents the leash from retracting based on the bias of the spring. A stop release mechanism disengages the stop mechanism and permits the lease to be retracted.

U.S. Pat. No. 7,281,495 (Wagner) describes a leash that is an extension of the collar material. A handle loop is attached to the end of the leash opposite the collar. The collar has a fastener adjacent the buckle on the opposite side of the buckle from the point of attachment of the leash. The leash has one fastener adjacent to the attachment point of the leash to the collar on the outside surface of the leash, and another on the inside surface of the leash positioned about halfway along the combined length of the leash and handle. The handle has a fastener on the outside surface adjacent its tip end. When not in use, the leash is wrapped about the collar to allow the inside surface leash fastener to engage the collar fastener. The leash is then folded and wrapped about the collar in the opposite direction to allow the outside surface leash fastener to engage the handle fastener.

U.S. Pat. No. 7,389,750 (Rogers et al.) describes a leash and collar system having a coupling that can allegedly be quickly attached and detached with one hand even while the coupling is pulled in tension. The coupling has male and female sections that selectively interconnect. A magnet is arranged within the receptacle at a base of the receptacle. The male section has an internal plunger that selectively moves between a forward position and a rearward position. Locking elements protrude from the male section when the internal plunger element is in the forward position. The locking elements prevent the male section from being retracted out of the receptacle.

U.S. Pat. No. 7,461,615 (Albright) describes a harness with a retractable leash secured on the harness so that it remains in a fixed location on the animal's back, even when the leash is not in use, making it comfortable for the animal, yet accessible for the user. The harness has a housing mounted thereto with a retractable leash system enclosed within the housing. The housing for the retractable leash system is mounted to the harness and holds a coiled spring with a leash surrounding a spool. A saddle portion allows permanent attachment of the housing and leash assembly to the harness. The leash length is adjustable as desired by the user by way of the coiled spring and spool.

U.S. Pat. No. 9,549,536 (Soto) describes a collar with a first magnetic member and a leash suitable for coupling with the magnetic member of the collar. The leash includes a hollow tubular member and a spool positioned at a first end of the hollow tubular member. The spool is wound with a leash line and a release line, the leash line and release line extending through the hollow tubular member. A magnetic attachment assembly is affixed to both the lease line and release line. The magnetic attachment assembly is suitable for releasably receiving the collar magnetic member.

U.S. Pat. No. 9,599,145 (Durfee) describes a magnetic clasp animal leash assembly for connecting to an animal collar having at least one metallic leash attachment ring defining an aperture. The assembly has two members movable with respect to one another between a closed position and an open position. The members have an internal surface creating an aperture in a closed state. Outer ends of the members are spaced from one another creating a passage with respect to the internal surface defining the aperture in an opened state. A magnet is located opposite from the clear passage proximate to the internal surface of the aperture. An actuator assembly is engageable with the members to drive the members toward the open position.

U.S. Pat. Nos. 9,961,882 and 10,231,439 (Woods) describe a leash that is always on the collar, and can be used on nearly any collar. The leash includes a top housing, a bottom housing, and a separate retainer. The top housing has protrusions on opposing sides while the retainer has openings on opposite sides that engage the protrusions in the top housing to enable the bottom housing to be secured between the top housing and retainer. The housing has a coiled power spring secured at a first end with a spool being secured to a second end. The spool has a first end of a lanyard secured therein while a second end of the lanyard is secured to a handle outside of the housing. The lanyard passes through a lanyard retainer. The collar is slidably securable within a gap between the retainer and bottom housing. An alleged advantage of this leash is that the leash can be removed and placed on a different collar when the animal grows and when the collar wears out or is damaged.

U.S. Pat. Appln. Publ. No. 20190059333 (Lagarde) describes a magnetic collar and combination leash apparatus including a fastener member at a first end of a belt member with the leash portion being at a second end of the belt member. The second end is threaded through the fastener member so that the leash portion is double-backed to overlie the belt member. The leash portion is coupled to the belt member proximal the first end by two magnets. Force applied to the belt member is said to be borne by the ring member until the leash portion is grasped manually and pulled away from the belt member, whereby the leash portion is deployed.

U.S. Pat. Appln. Publ. No. 20190208748 (Young) describes a retractable pet leash including a collar assembly, a flexible loop-shaped handle member having a connector located on an inner surface to allow the handle to be securely closed for folding, and a first hub assembly in a forward end of the handle member and having a biased member connected to a first end of a leash. An opening in the forward end of the handle member allows the leash line to extend therethrough in response to extension and retraction of the leash line from the first hub assembly. A second hub assembly is located on the collar assembly and includes a biased member connected to a second end of a leash. A leash connector couples the leash to the first hub assembly and the second hub assembly. The connector may include a magnet.

WO1985001857A1 (Sleight) describes a combined animal collar and leash of longitudinal strip webbing material. The collar and the leash have VELCRO™ connecting means that releasably connect the leash upon the collar to store the leash upon the collar when not in use. The leash has a handle at one end.

None of these prior art leashes is believed to be configured for use with a potentially conventional collar that is worn around the pet's neck and can be coiled or wound around the collar when not in use using magnetism.

OBJECTS AND SUMMARY OF THE INVENTION

It is an object of at least one embodiment of the invention to provide a new and improved leash for an animal, usually a person's pet that they walk.

It is another object of at least one embodiment of the invention to provide a new and improved leash for an animal that can be retained around the animal's neck, and specifically around a collar on the animal, when not in use.

It is yet another object of at least one embodiment of the invention to provide a new and improved leash for an animal that can be expanded to a use state from a non-use state wound or coiled around the animal's neck.

It is still another object of at least one embodiment of the invention to provide a new and improved leash for an animal that uses magnetism to enable the leash to be retained in a wound or coiled state around the animal's neck when not in use.

In order to achieve one or more of these objects or other objects, a wearable magnet-containing leash in accordance with the invention wraps around the neck of a domesticated pet or other animal, e.g., a dog, when not in use. The leash connects to an ordinary and conventional collar on the dog just like other conventional leashes, for example, with a metal P-lock. However, instead of disconnecting the leash from the collar after the person walks the dog, the person is able to wrap the leash around the dog's neck and it connects to itself via magnets to provide a coiled or wound state. By being retained on the dog's neck, the leash is always accessible and can be pulled right off the dog's neck once it is needed again. The presence of the magnets on the leash is not believed to adversely affect the dog.

More specifically, one embodiment of an animal leash in accordance with the invention includes an elongate member having a first end region and a second end region at an opposite end of the member from the first end region, a clip arranged at the first end region of the member and configured to attach to a collar on the animal, and first and second distinct pairs of magnetically coupleable magnets. The first pair of magnets includes a first magnet at or in the first end region and a second magnet movable between the first and second end regions and the second pair of magnets includes a third magnet movable between the first and second end regions and a fourth magnet at or in the second end region. The member has an extended, usable state in which the magnets are not magnetically coupled to one another, i.e., one magnet in each pair is not coupled to the other magnet in that pair. The magnets are configured and polarized to enable the magnets in the first and second pairs of magnets to be magnetically coupled to one another, i.e., one magnet in each pair is coupled to the other magnet in that pair, and provide the member with a coiled state, i.e., a non-use state around the neck of the animal with which the leash is used.

By reciting first and second distinct pairs of magnets, it is meant that if a magnet is considered to be part of one pair of magnets, it is not also part of another pair of magnets. Also, this recitation of first and second distinct pairs does not limit the leash to only first and second distinct pairs of magnets, but one or more additional pairs of magnets may be provided in a leash in accordance with the invention.

The second and third magnets may be retained in or by, or housed in, movable magnet retainers arranged on the member between the first and second end regions and thus between the first and fourth magnets.

In addition to the second and third magnets being retained in or by respective movable magnetic retainers, the first and/or the fourth magnets may also be retained in respective movable magnetic retainers. Thus, it is possible that all four magnets may be retained in or by movable magnetic retainers and can be freely positioned along the length of the member. This positioning is useful to ensure that the magnets engage one another when the leash is in its non-use, coiled or wound state around the animal's collar and neck.

Alternatively, the first and fourth magnets may be fixed to the member, e.g., sewn into the member, or retained in or by a retainer fixed or secured to the member at a specific longitudinal position. Since the second and third magnets are still movable, their position can be adjusted to engage with the first or fourth magnets when the leash is in its non-use, coiled or wound state around the animal's collar and neck.

Each retainer for the fixed magnets may include a first part in which the magnet is situated, a second part, a hinge connecting the first and second parts and a cooperating latching mechanism on the first and second parts to provide the first and second parts with a first latched position forming a slot through which at least a part of the member passes and a second open position in which the magnet retainer is removable from the member. However, when in the latched position, the retainer is not slidable along the member.

Each retainer for the movable magnets may include a slot through which at least a part of the member passes, with the magnet being situated on one side of the slot.

Another way to consider the invention is as an animal leash that includes an elongate member having a first end region and a second end region at an opposite end of the member from the first end region, a clip arranged at the first end region of the member and configured to attach to a collar on the animal, and a magnetic coupling arrangement that provides at least two magnetic couplings along the length of the member to provide the member with a coiled state in which the magnetic couplings are present and an extended state in which the magnetic couplings are not present. The magnetic coupling arrangement includes a first magnet at a first end region of the member and a second magnet at a second end region at an opposite end of the member from the first end region.

The magnetic coupling arrangement may also include a third magnet movable longitudinally along the member between the first and second end regions and a fourth magnet movable longitudinally along the member between the first and second end regions. The third and fourth magnets are between the first and second magnets with the third magnet being between the first and fourth magnets. The third magnet is configured and polarized to magnetically couple to the first magnet when the member is in the coiled state and the fourth magnet is configured and polarized to magnetically couple to the second magnet when the member is in the coiled state. The third and fourth magnets may be different parts of a common magnet.

Movable retainers may retain the third and fourth magnets between the first and second end regions. Also, movable retainers may retain the first and second magnets and be movable longitudinally along the member including to a position in the first end region or the second end region, respectively. Alternatively, the first and second magnets may be fixed in position on the member, or retained in or by a retainer that is fixed or secured to the retainer, i.e., at or in the first or second end region, respectively.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 1A is an enlarged view of the area designated 1A in FIG. 1;

DETAILED DESCRIPTION OF THE INVENTION

Figure 1:
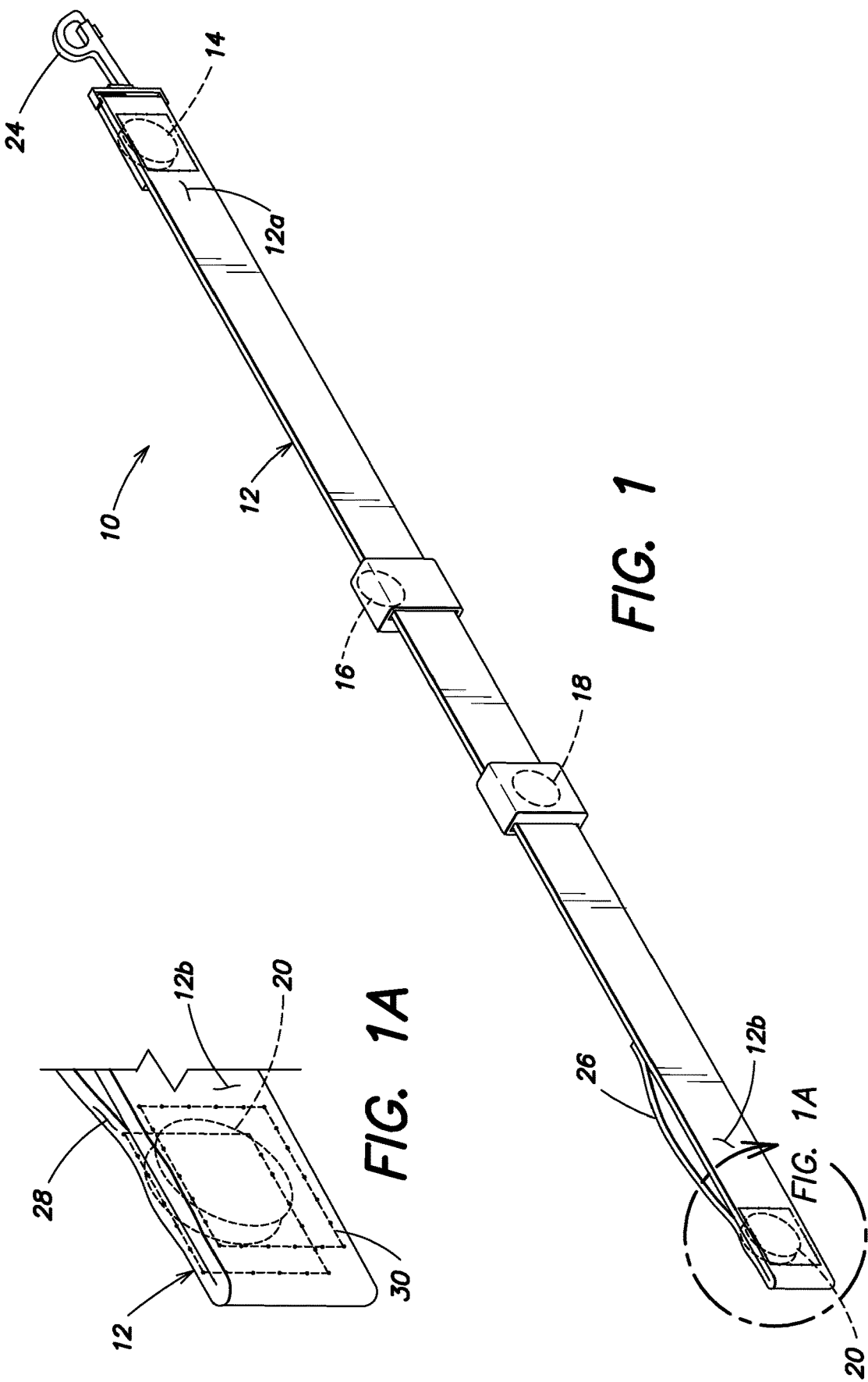
FIG. 1 is a perspective of a first embodiment of a leash in accordance with the invention.

Referring to the accompanying drawings wherein the same reference numbers refer to the same or similar elements, FIG. 1 shows a first embodiment a leash 10 in accordance with the invention which includes an elongate member 12 and four magnets 14, 16, 18, 20 situated at different locations along the longitudinal extension or length of the member 12.

Figure 4:
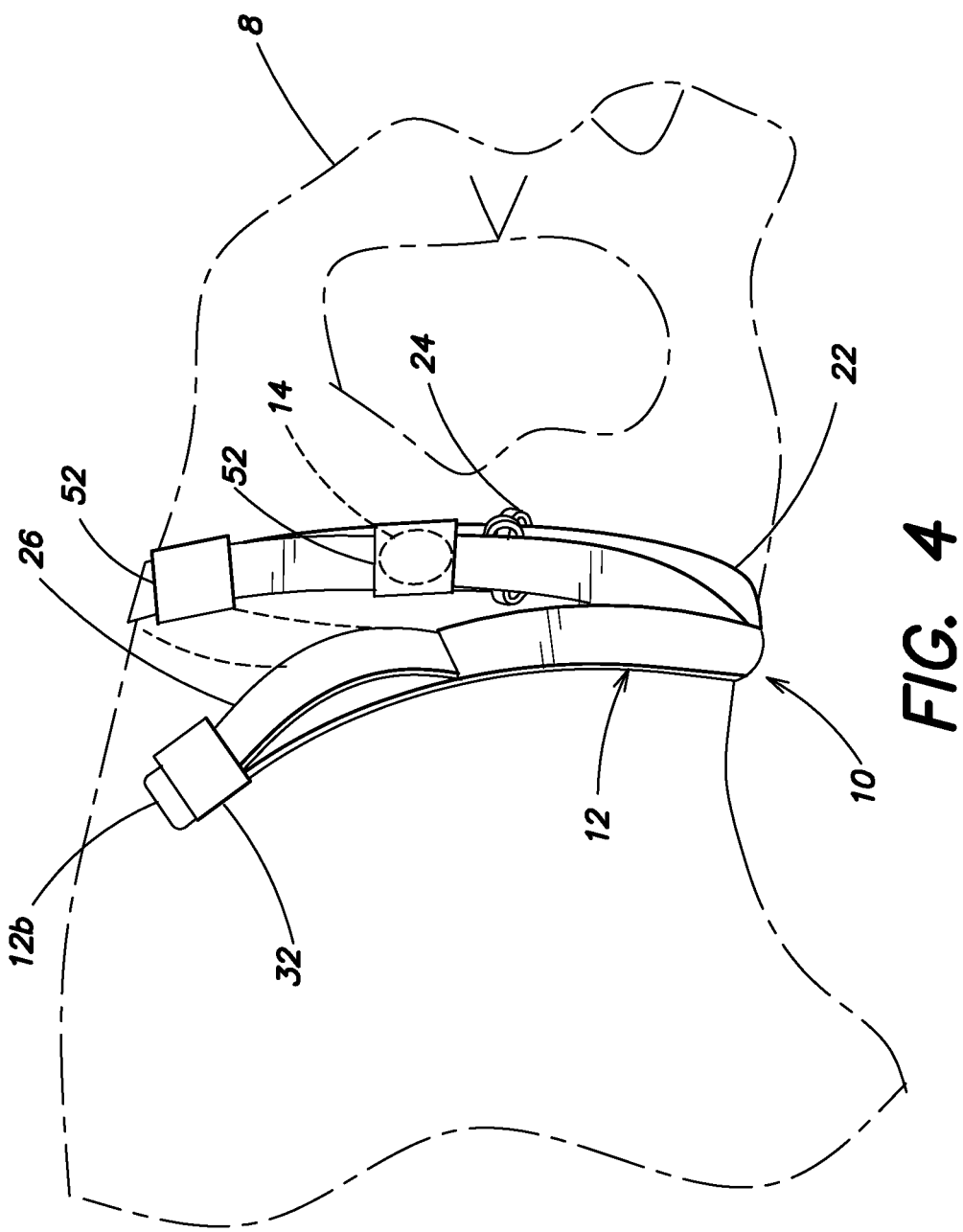
FIG. 4 is a perspective view showing the leash in accordance with the invention around the animal's neck in a partly apart state.

Leash 10 is designed to attach to a collar 22 of an animal, for example a dog 8 as shown in FIG. 4. and to this end includes a P-lock 24 at one end. The P-lock 24 is an example of an attachment mechanism or attachment means that connect the leash 10 to the collar 22 and other attachment structure comparable or equivalent to a P-lock 24 may be used in the invention. One skilled in the art would realize what other structure is comparable and equivalent to a P-lock 24. Attachment means as used herein to attach the leash 10 to the collar 22 therefore encompasses a P-lock and any and all other comparable and equivalent structure known to those skilled in the art to which this invention pertains. The attachment means typically provide an easy and manual attachable and detachable, yet secure, connection of the leash 10 to the collar 22.

The member 12 may be made of any material from which a leash is made, e.g., fabric, and will typically form a loop 26 at one end through which the user inserts their hand to grasp the leash 10 when attached to an animal, e.g., their pet dog 8, and enable them to walk their dog 8 when the leash 10 is in an extended, use state.

In this embodiment, magnets 14, 20 are stationary on the member 12 one at each end or end region 12a, 12b of the member 12. Magnet 14 is situated just after and preferably adjacent to the P-lock 24. The magnets 14, 20 are oriented relative to the member 12 with a specific polarity, as discussed below. To achieve their stationary positioning, the magnets 14, 20 may be fixed to the member 12 or secured in a retainer that is fixed to or secured to the member 12.

Specifically, as shown in FIG. 1A, magnets 14, 20 may be fixed to the member 12 by sewing fabric in a pattern, e.g., each magnet 14, 20 is surrounded by fabric 28 of the member 12 and then sealed in a space formed by the fabric 28 by stitches 30. Other means for fixing the magnets 14, 20 to the member 12 may be used in the invention, with this fixing being a permanent placement in the member 12. Permanent in this context means that the magnets 14, 20 cannot be removed without damaging or destroying the member 12. In other embodiments of the invention, the magnets 14, 20 are not fixed to the member 12 but rather secured thereto in a fixed position.

Figure 2:
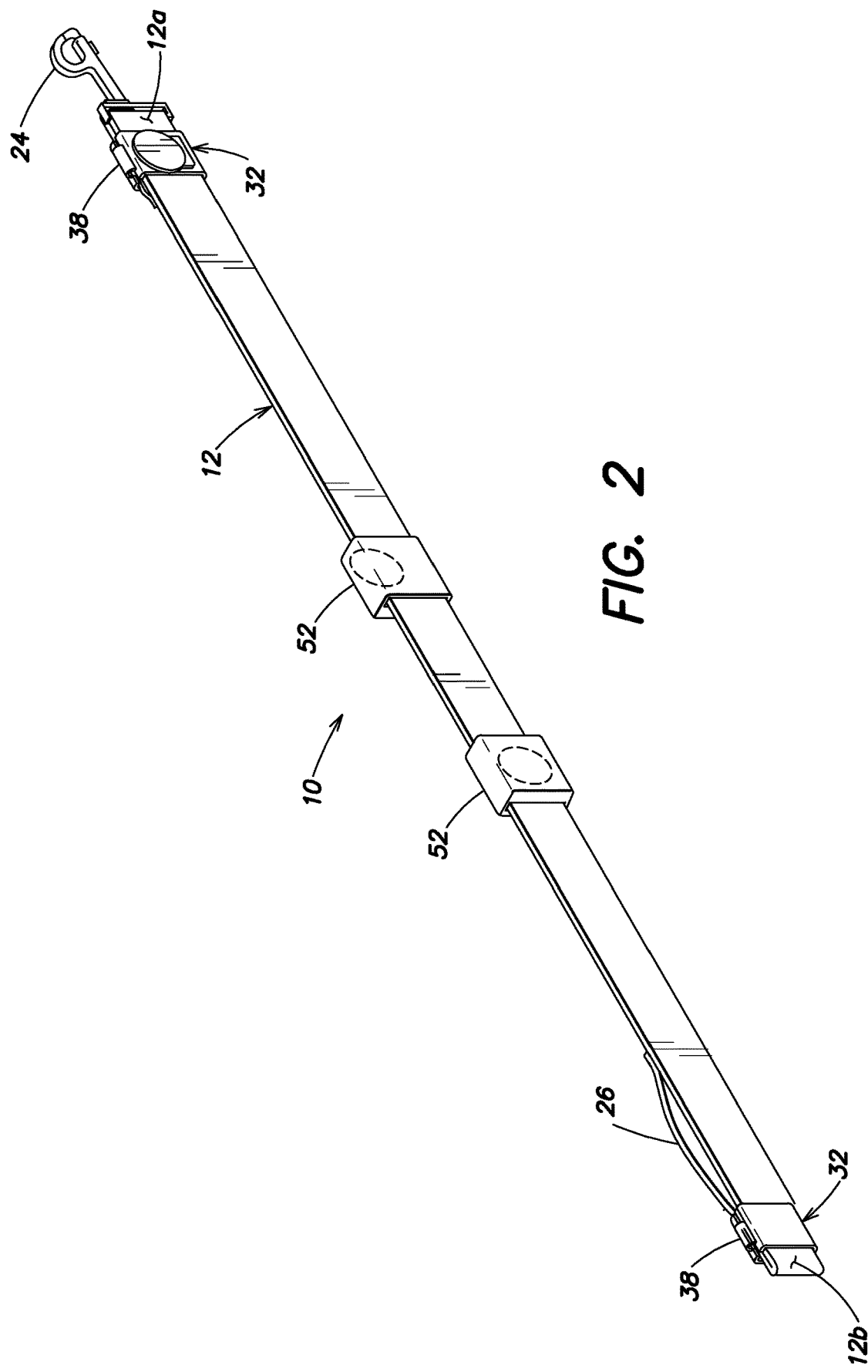
FIG. 2 is a perspective view of a second embodiment of a leash in accordance with the invention.
Figure 5:
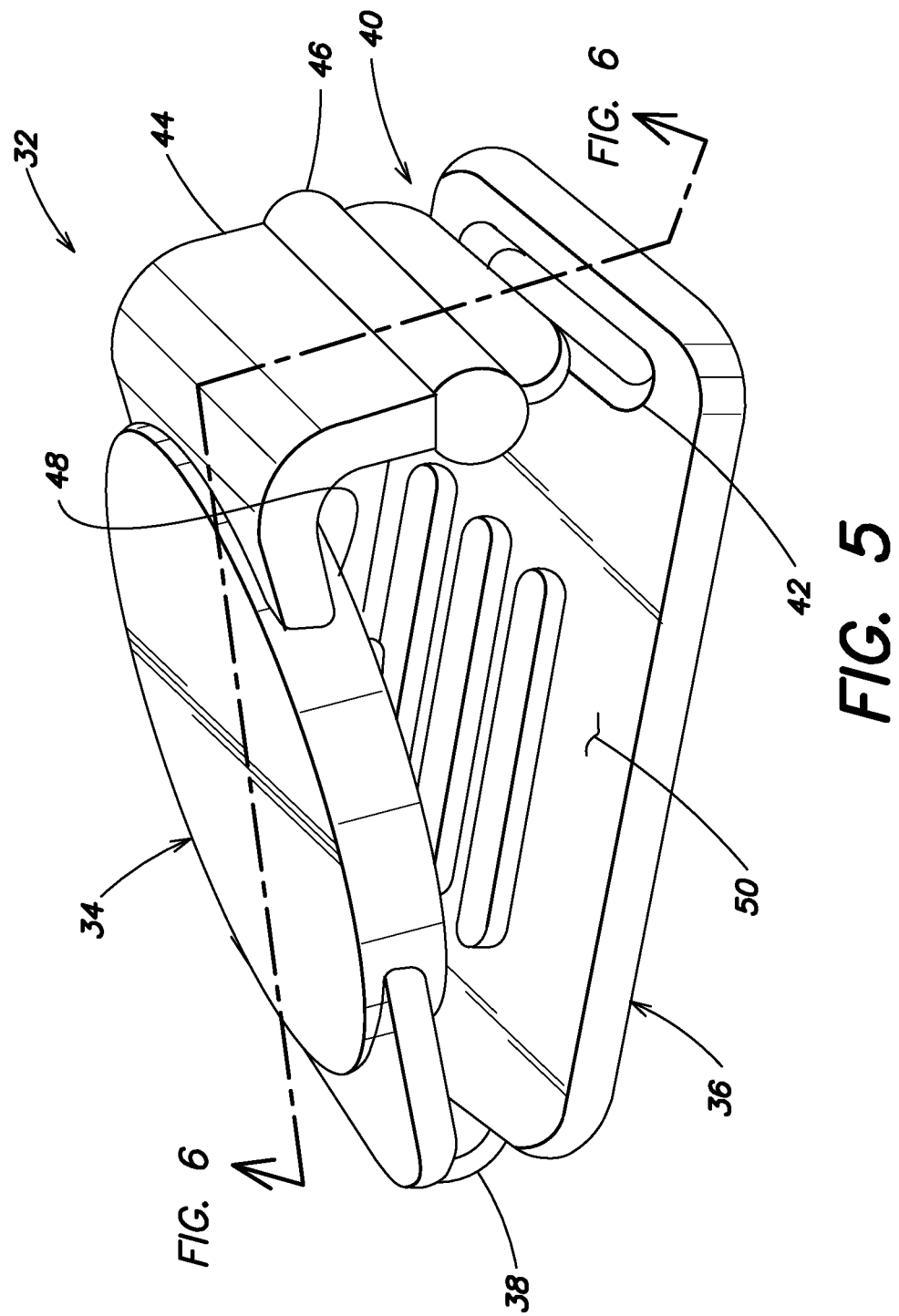
FIG. 5 is a perspective view of a fixed magnet retainer of the leash in accordance with the invention.
Figure 6:
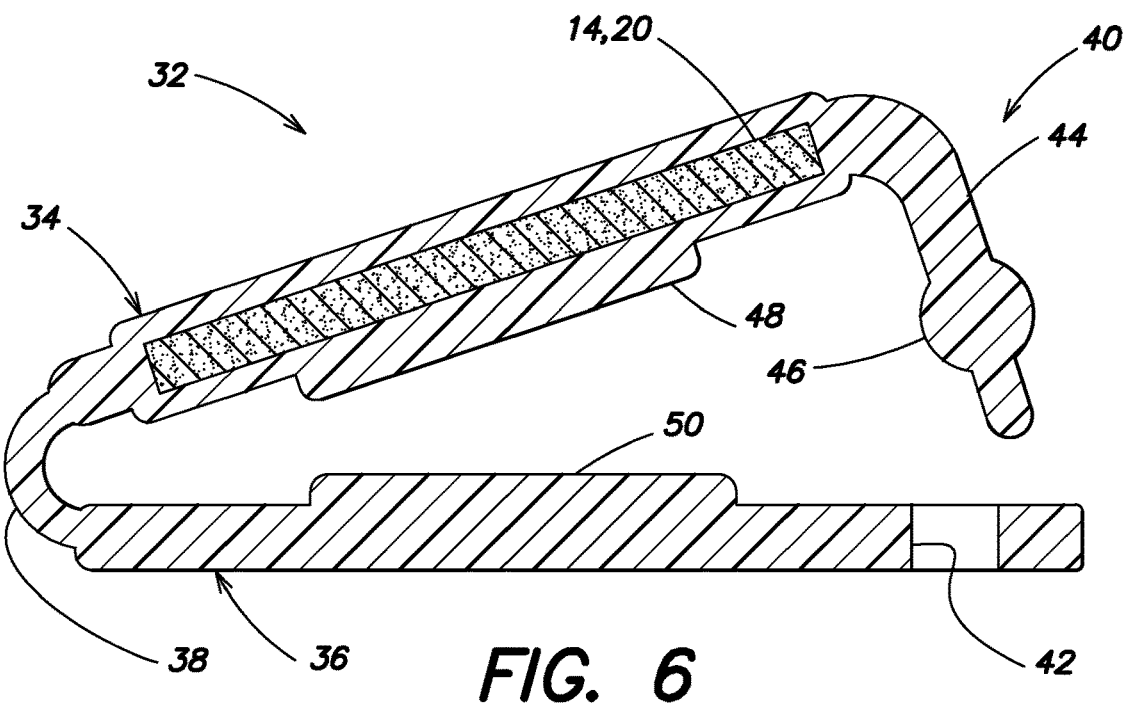
FIG. 6 is a cross-sectional view taken along the line 6-6 of FIG. 5.
Figure 7:
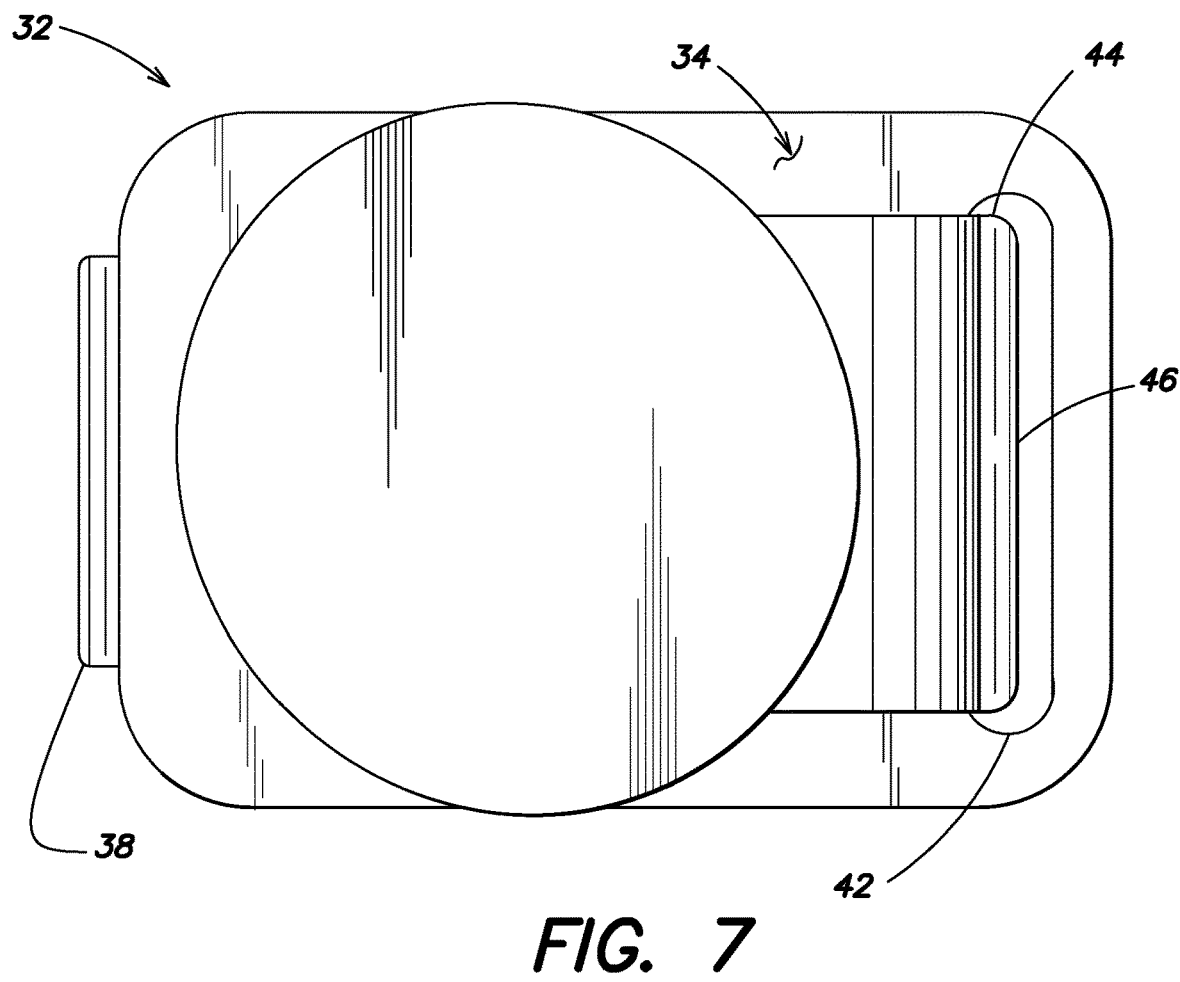
FIG. 7 is a top view of the magnet retainer of FIG. 5.

Referring in this regard to FIG. 2, instead of permanently fixing the magnets 14, 20 in connection with the member 12, each magnet 14, 20 in this embodiment of the invention may be retained in or by a respective retainer 32 which is secured to the member 12 in an at least temporary, fixed position. As shown in FIGS. 5-7, each retainer 32 includes a first part 34 in which the respective magnet 14 or 20 is situated, a second part 36 spaced apart from the first part 34 but connected thereto by a hinge 38 along an edge of the first and second parts 34, 36, and a latching mechanism 40 on an opposite side of the first and second parts 34, 36 from the hinge 38.

The latching mechanism 40 includes a slot 42 on the first part 34 and a projection 44 on the second part 36. The projection 44 has a bulge 46 around its circumference that is configured relative to the slot 42 to enable the projection 44 to be urged through the slot 42 so that the bulge 46 is below the slot 42 and retains the projection 44 in connection with the slot 42 and thus the second part 36 in connection with the first part 34. Each retainer 32 can thus assume a latched position in which the projection 44 is engaged with the slot 42 and in which the member 12 is situated in a slot between the first and second parts 34, 36 and pressed between inner facing surfaces 48, 50 of the first and second parts 34, 36, respectively (see FIG. 7), to thereby secure the retainer 32 to the member 12. The slot 42 is dimensioned accordingly to be able to accommodate the cross-sectional shape and size of the member 12.

When not in the latched position, each retainer 32 has an open position in which the retainer 32 is separable from the member 12 and the projection 44 is separated from the slot 42 (see FIG. 6). In this state, it is possible to insert the member 12 into the slot defined between the first and second parts 34, 36 and also adjust the position of the retainer 32 relative to the member 12, e.g., to be in or at the first or second end regions 12a, 12b.

Figure 8:
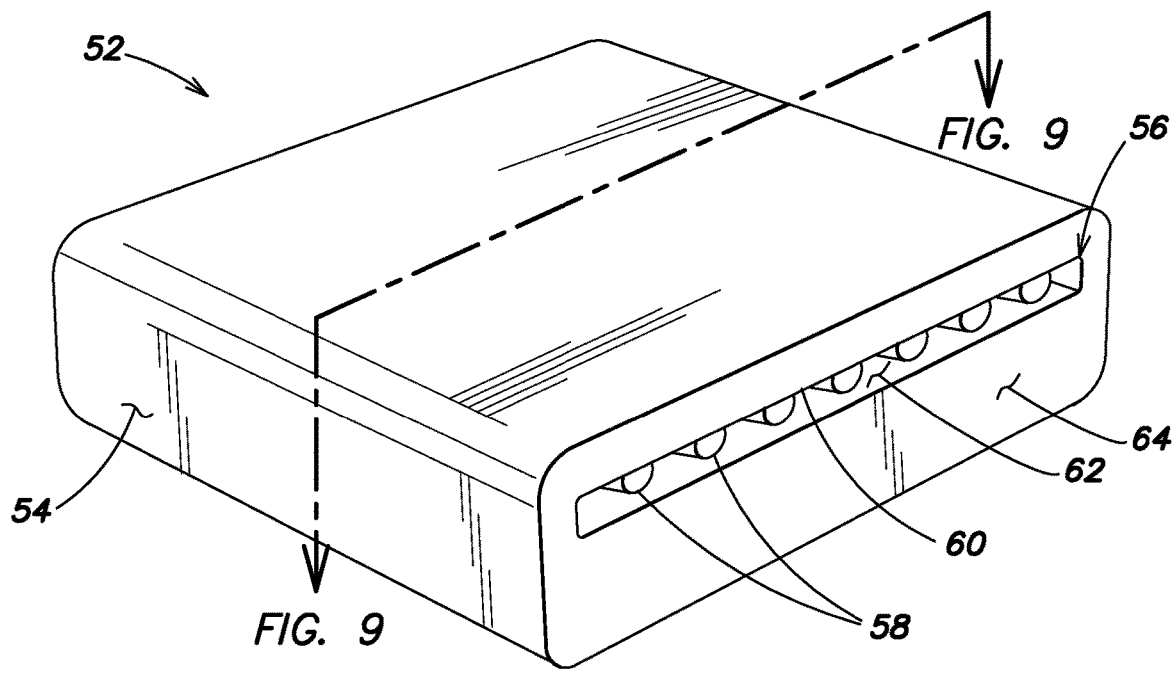
FIG. 8 is a perspective view of a movable magnet retainer of the leash in accordance with the invention.
Figure 9:
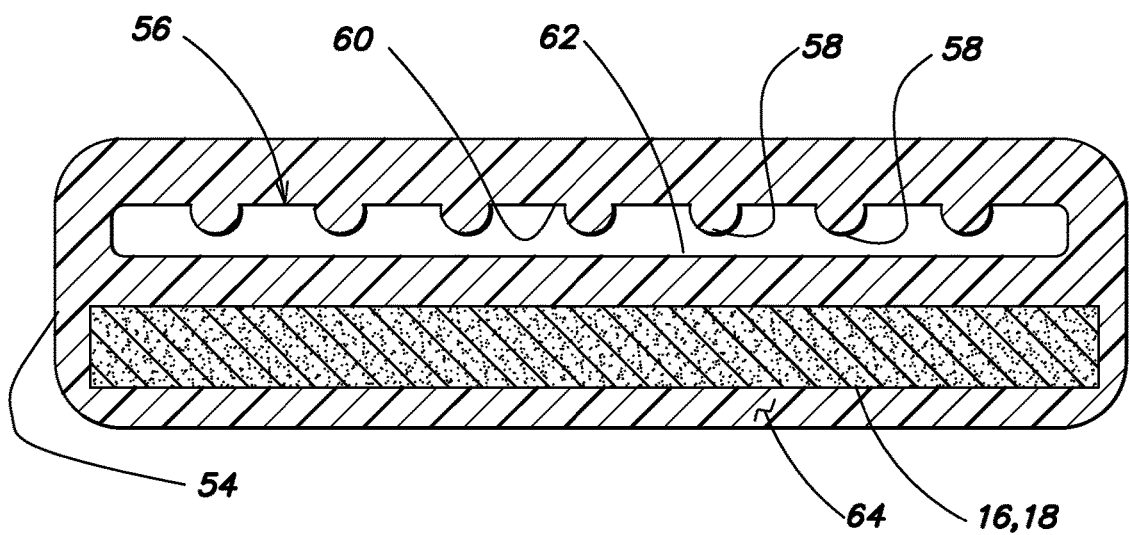
FIG. 9 is a cross-sectional view taken along the line 9-9 of FIG. 8.

Referring now to FIGS. 8 and 9, a preferred retainer for magnets 16, 18 is a movable magnet retainer 52. Magnet retainers 52 have an adjustable position along the length of the member 12 so that they can move to align with magnets 14 and 20, respectively when the leash 10 is in a non-use state coiled or wound around the animal's collar 22.

Magnet retainers 52 each comprise a housing 54 defining a slot 56 extending between opposite sides and having one or more elongate ridges 58 on an inner surface 60 defining the slot 56. The thickness of the slot 56 between the inner surface 60 and an opposing inner surface 62 is selected relative to the thickness of the member 12 to allow for manual sliding of the housing 54 longitudinally along the member 12. The respective magnet 16, 18 is situated in a part 64 of the housing 54 opposite the ridges 58. The slot 56 is dimensioned accordingly to be able to accommodate the cross-sectional shape and size of the member 12.

Housings 54 may be installed on the member 12 during its manufacture or possibly afterwards. Once installed on the leash 10, the housings 54 are unable to be slid off of the member 12 in view of the presence of the retainers 32 at the end regions 12a, 12b of the member and also in view of the P-lock 24 at one end which often has a portion thicker than the member 12.

Each magnet retainer 52 retains one or more magnets in the sense that the respective magnet(s) 16, 18 is secured to a body (housing 54) and moves along with movement of the body. Hence, longitudinal movement of the body along the length of the member 12 by the user causes movement of the magnet 16, 18 to a desired position to enable it to magnetically couple to another magnet (14 or 20, respectively). The manner in which each magnet 16, 18 may be retained by or in the respective retainer 52 is not limited to the disclosed embodiments and any such retention structure may be used in the invention. As shown, the magnets 16, 18 are retained by the respective retainer 52 by being housed within structure of the retainer 52, e.g., a plastic structure that encloses the magnet 16, 18. The invention is however not limited to retaining structure that houses a magnet and it is possible that the magnet may not be entirely enclosed within a structure and thus at least partly exposed. Exposure of the magnet could improve magnetic coupling force.

It is very advantageous that magnets 16, 18 be retained by movable retainers 52 or comparable magnet housings because the leash 10 may be used with dogs having different size necks. If the magnets 16, 18 were to be fixed in position, they would be suited for only dogs with a specific neck size. For dogs with larger or smaller neck sizes, the magnets 16, 18 would not align with magnets 14, 20 when the leash 10 is in its coiled or wound state and the leash 10 could not be optimally used, i.e., securely stored around the dog's neck when not in use. Hence, the movability of magnets 16, 18 is important. The alternative would be, if magnets 16 18 were not movable, to manufacture leashes 10 with magnets 16, 18 at different stationary positions along the length of the member 12 and correlate the positions of the magnets 16, 18 to the neck size of the pet for which the leash 10 is to be used to enable the leash to coil and provide for magnetic coupling for the specific pet neck size. One problem is that if the dog grows, and their neck gets larger, the leash would no longer fit them. Another problem is if the user buys the wrong size leash. Yet another problem is that the leash could not be used on another dog.

In use, the user attaches the P-lock 24 to the dog's collar 22, see FIG. 4, and if walking the dog 8, the leash 10 is used in the usual manner. When the walk is over and the user wants to store the leash 10, the user, while preferably keeping the dog 8 in a stationary position, winds the leash 10 around the dog's neck to bring the second magnet 16 into contact with the first magnet 14 (see FIG. 4). A portion of the member 12 between the first and second magnets 14, 16 will thus be wound about the dog's collar 22. The user continues this winding motion of the member 12 around the dog's neck until the third magnet 18 is around the dog's neck and further continues the winding motion until the fourth magnet 20 is in contact with the third magnet 18. The member 12 is thus now completely wound around the dog's neck with two magnetic couplings, i.e., between the first and second magnets 14, 16 and between the third and fourth magnets 18, 20. These two magnetic couplings keep the member 12 in a coiled state (see FIG. 3).

Figure 3:
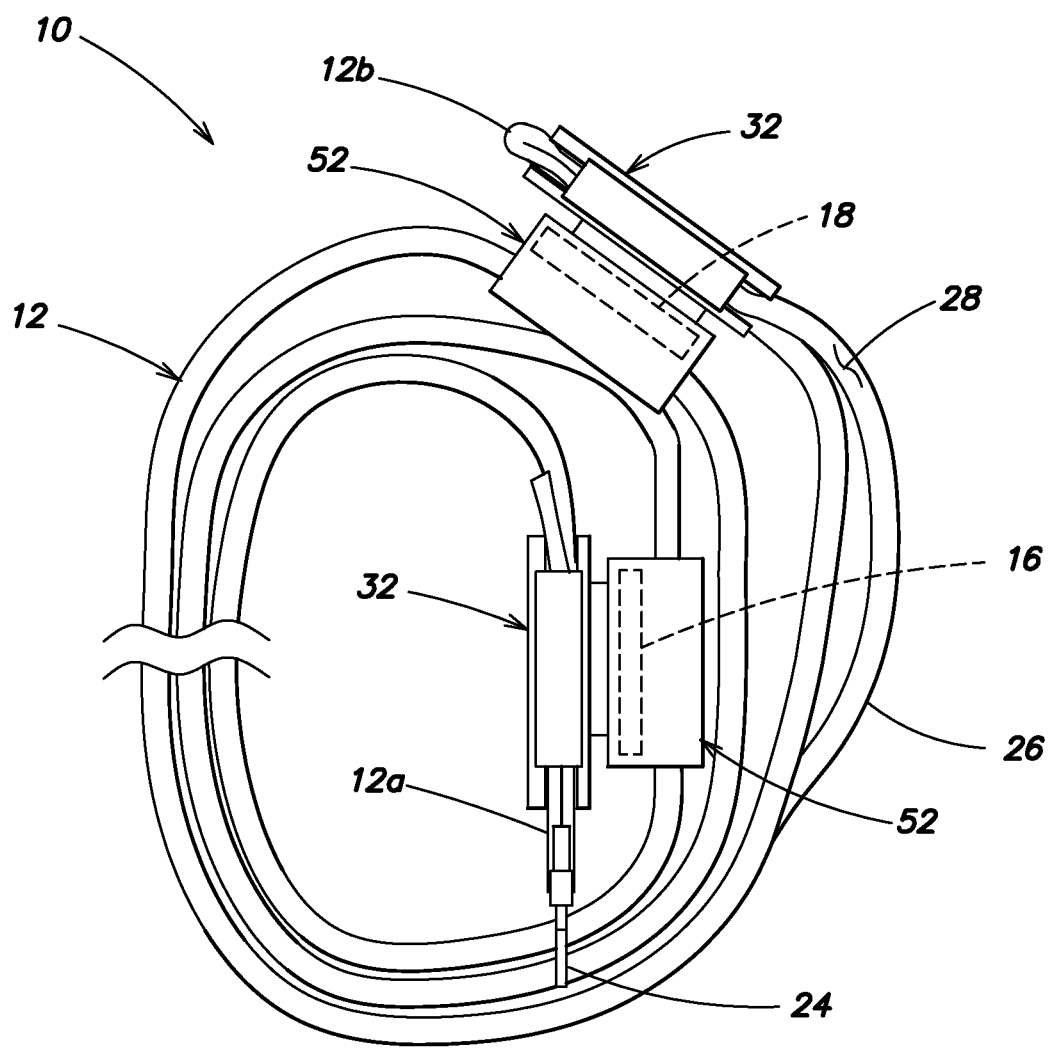
FIG. 3 shows the leash in accordance with the invention coiled up in a non-use state, which would be its state when around an animal's collar and neck.

As mentioned above an referring back to FIGS. 1 and 2, the orientation and configuration of the magnets 14, 16, 18, 20 is important to enable the magnetic coupling between magnets 14 and 16 and between magnets 18, 20 when the member 12 is in its coiled, non-use state shown in FIG. 3. To this end, magnets 14, 16, 18, 20 alternate the side of the member 12 they are on. That is, magnets 14 and 18 are situated on one side of the member 12, e.g., the topside shown facing out of the page in FIGS. 1 and 2, while magnets 16, 20 are situated on the opposite side of the member 12, i.e., the underside of bottom side shown facing into the page in FIGS. 1 and 2. With this positioning, magnet 14 on the topside is able to couple to magnet 16 on the bottom side and magnet 18 on the topside is able to couple to magnet 20 on the bottom side (see FIG. 3).

Moreover, magnets 14, 18 will be oriented to have their positive charge S facing outward away from the member 12, and magnets 16, 20 will be oriented to have their negative charge N facing outward away from the member 12. In this manner, when magnet 16 is in contact with magnet 14, there will be magnetic attraction between the S and N charges. Similarly, when magnet 20 is in contact with magnet 18, there will be magnetic attraction between the S and N changes. Obviously, the reverse magnetic orientation is also possible. One skilled in the art would readily understand from the disclosure herein how to orient the magnets with their polarity to ensure magnetic coupling between magnets 14 and 16 and between magnets 18 and 20.

The shape of the magnets 14, 16, 18, 20 may vary from that shown. The illustrated shape of the magnet does not limit the invention in any manner whatsoever.

Although retainers 32 are designed for use to retain or house the magnets 14, 20, respectively, which will be situated at the end regions 12a, 12b, they may also be used to house magnets 16, 18. This is not a preferred embodiment because it would unnecessarily restrict the ability to easily move magnets 16, 18 along the member 12 to a desired magnetic coupling position with the magnets 14, 20, respectively. Nevertheless, such an embodiment is considered part of the invention, and should not be deemed to be precluded by the claims.

Variations to the above configurations of magnets 14, 16, 18, 20 are possible. In one configuration, numerous magnets are placed along the entire length of the member 12, for example, sewn into or otherwise fixed to the member 12. The member 12 can then be easily magnetically attached to itself along the entire length when in the non-use state.

In another configuration, instead of magnets, other cooperating attachment structure may be used, e.g., snaps, buttons, or VELCRO™, which would be positioned at specific locations and possibly in a fixed retainer or housing in or at the end regions 12a, 12b or in movable housings between the end regions 12a, 12b of the member 12.

Although the embodiment disclosed above include four magnets, one at each of the two opposite ends or end regions of the member and two movable ones therebetween, it is possible in accordance with the invention to provide a larger number of magnets. For example, one or more additional pairs of movable magnets can be provided between the end-situated magnets so that, if one additional pair of magnets is provided, there would be a total of six magnets on the member. When the leash is in its non-use state coiled around the animal's neck, there would thus be three engaged pairs of magnets providing a more secure coil for the leash than if only four magnets were to be provided.

The optimum number of magnets for a leash in accordance with the invention may depend on the length of the leash, with a longer leash having more magnets than a shorter leash. The length of the leash 10 is variable, as represented by the cut lines in FIG. 3. Since the intermediate magnets, i.e., those between the end-situated magnets, can be designed to be removable from engagement with the member, a kit may be provided with the member and at least four removable magnets or any greater even number of magnets. The user then places the number of magnets they feel would be best to enable the leash to be wound around the neck of their pet.

In the magnet retainers 32, 52 disclosed above, there is a magnet that is situated on only one side of the member 12 when the retainer 32, 52 is fixed or movably attached to the member 12, see FIGS. 1 and 2. The side on which the magnet is situated, along with the orientation of the magnet polarity, is important to enable each magnet to magnetically couple to another magnet. However, it is also considered an aspect of the invention that a magnet retainer may be configured to position a single magnet that extends to both sides of the member, e.g., alongside a lateral edge of the member defined between its two major sides. Such a magnet would be able to perform the functionality of two magnets of the leash in accordance with the invention. As such, reciting that a magnet retainer includes or comprises a magnet does not preclude the magnet retainer from including one magnet that uses both of its poles for magnetic coupling to another magnet of the leash 10.

Yet another configuration of a magnet retainer would include two or more magnets, with at least one on each side of the member, e.g., each major side of the member. The magnetic polarity of each of the magnets on a common magnet retainer is oriented to enable the magnet retainer to be magnetically coupled to another magnet retainer requiring the user to only turn the magnet retainer if the magnet retainer does not initially magnetically couple to the other magnetic retainer. As such, reciting that a magnet retainer includes or comprises a magnet does not preclude the magnet retainer from including one or more additional magnets.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. Among other modifications, features of the U.S. patent mentioned above, all of which are incorporated by reference herein, can be used in the leash in accordance with the invention to the extent possible, and all such modifications are considered by the inventor to be part of the invention.

The invention claimed is:

1. An animal leash, comprising:
   an elongate member having a first end region and a second end region at an opposite end of said member from said first end region;
   a clip arranged at said first end region of said member and configured to attach to a collar on the animal; and
   first and second distinct pairs of magnetically coupleable magnets, said first pair of magnets including a first magnet at said first end region and a second magnet movable longitudinally along said member between said first and second end regions and said second pair of magnets including a third magnet movable longitudinally along said member between said first and second end regions and a fourth magnet at said second end region;

said member having an extended state in which said magnets of said first and second pairs of magnets are not magnetically coupled to one another, said magnets being configured and polarized to enable said magnets of said first and second pairs of magnets to be magnetically coupled to one another and provide said member with a coiled state.

2. The animal leash of claim 1, further comprising a first movable magnet retainer arranged on said member between said first and second end regions and that retains said second magnet and a second movable magnet retainer arranged on said member between said first and second end regions and that retains said third magnet.

3. The animal leash of claim 2, wherein said first magnet retainer comprises a slot through which at least a part of said member passes, said second magnet being on one side of said slot.

4. The animal leash of claim 2, wherein said first magnet retainer comprises a first part in which said second magnet is situated, a second part, a hinge connecting said first and second parts and a cooperating latching mechanism on said first and second parts to provide said first and second parts with a first latched position forming a slot through which at least a part of said member passes and a second open position in which said first magnet retainer is removable from said member.

5. The animal leash of claim 2, wherein said first and fourth magnets are permanently fixed in position on said member.

6. The animal leash of claim 2, further comprising a third magnet retainer which retains said first magnet and a fourth magnet retainer which retains said fourth magnet.

7. The animal leash of claim 6, wherein said third and fourth magnet retainers are each movable along said member.

8. The animal leash of claim 1, wherein said first and fourth magnets are movable longitudinally along said member.

9. The animal leash of claim 1, wherein said first and fourth magnets are permanently fixed in position on said member.

10. The animal leash of claim 9, wherein said member comprises fabric and said first and fourth magnets are permanently fixed in position on said member by sewing said first and fourth magnets into said fabric of said member.

11. The animal leash of claim 1, further comprising two additional magnet retainers that each retain a respective one of said first and fourth magnets.

12. The animal leash of claim 11, wherein said two additional magnet retainers are movable longitudinally along said member.

13. The animal leash of claim 11, wherein each of said two additional magnet retainers comprises a slot through which at least a part of said member passes, said first or fourth magnet being on one side of said slot of the respective one of said two additional magnet retainers.

14. The animal leash of claim 11, wherein each of said two additional magnet retainers comprises a first part in which the respective one of said first and fourth magnet is situated, a second part, a hinge connecting said first and second parts and a cooperating latching mechanism on said first and second parts to provide said first and second parts with a first latched position forming a slot through which at least a part of said member passes and a second open position in which said additional magnet retainer is removable from said member.

15. An animal leash, comprising:
an elongate member having a first end region and a second end region at an opposite end of said member from said first end region;
a clip arranged at said first end region of said member and configured to attach to a collar on the animal; and
a magnetic coupling arrangement that provides at least two magnetic couplings along a length of said member to provide said member with a coiled state in which said at least two magnetic couplings are present and an extended state in which said at least two magnetic couplings are not present, said magnetic coupling arrangement comprising:
a first magnet at a first end region of said member,
a second magnet at a second end region of said member at an opposite end of said member from said first end region,
a third magnet movable longitudinally along said member between said first and second end regions, and
a fourth magnet movable longitudinally along said member between said first and second end regions,
said third and fourth magnets being between said first and second magnets with said third magnet being between said first and fourth magnets,
said third magnet being configured and polarized to magnetically couple to said first magnet when said member is in the coiled state and said fourth magnet being configured and polarized to magnetically couple to said second magnet when said member is in the coiled state.

16. The animal leash of claim 15, further comprising a first movable magnet retainer arranged on said member between said first and second end regions and that retains said third magnet and a second movable magnet retainer arranged on said member between said first and second end regions and that retains said fourth magnet.

17. The animal leash of claim 16, further comprising a third movable magnet retainer which retains said first magnet and a fourth movable magnet retainer which retains said second magnet, said third movable magnet retainer being movable longitudinally along said member including to a position in said first end region, said fourth movable magnet retainer being movable longitudinally along said member including to a position in said second end region.

18. The animal leash of claim 15, wherein said first and second magnets are permanently fixed in position on said member.

19. The animal leash of claim 15, further comprising a first magnet retainer which retains said first magnet in said first end region of said member and a second magnet retainer which retains said second magnet in said second end region of said member, said first and second magnet retainers being movable longitudinally along said member.

20. An animal leash, comprising:
an elongate member having a first end region and a second end region at an opposite end of said member from said first end region;
a clip arranged at said first end region of said member and configured to attach to a collar on the animal; and
a magnetic coupling arrangement that provides at least two magnetic couplings along the length of said member to provide said member with a coiled state in which said at least two magnetic couplings are present and an extended state in which said at least two magnetic couplings are not present, said magnetic coupling arrangement comprising:
- a first magnet at a first end region of said member;
- a second magnet at a second end region of said member at an opposite end of said member from said first end region;
- a first magnet retainer which retains said first magnet in said first end region of said member; and
- a second magnet retainer which retains said second magnet in said second end region of said member,
- said first and second magnet retainers being movable longitudinally along said member.

* * * * *